United States Patent [19]

Cochard et al.

[11] 4,308,846
[45] Jan. 5, 1982

[54] METHOD FOR MEASURING THE RATE OF RECIRCULATION OF EXHAUST GASES IN AN INTERNAL COMBUSTION ENGINE AND DEVICE FOR PUTTING SAID METHOD INTO PRACTICE

[75] Inventors: Pierre Cochard, Saint-Vrain; Bruno de Saint-Marie, Châtenay-Malabry, both of France

[73] Assignee: Regie Nationale des Usines Renault, Boulogne-Billancourt, France

[21] Appl. No.: 115,060

[22] Filed: Jan. 24, 1980

[30] Foreign Application Priority Data

Feb. 1, 1979 [FR] France .............................. 79 02650

[51] Int. Cl.³ ............................................ F02M 25/06
[52] U.S. Cl. .................................... 123/568; 123/571; 123/440; 123/1 R; 73/116
[58] Field of Search ................... 123/571, 568, 440, 1; 73/116

[56] References Cited

U.S. PATENT DOCUMENTS

| 3,872,846 | 3/1975 | Taplin et al. | 123/571 |
| 4,095,462 | 6/1978 | Goto | 73/116 |
| 4,130,098 | 12/1978 | Linder et al. | |
| 4,189,355 | 2/1980 | Fudishiro et al. | |
| 4,227,496 | 10/1980 | Martel | |

Primary Examiner—Wendell E. Burns
Attorney, Agent, or Firm—Oblon, Fisher, Spivak, McClelland & Maier

[57] ABSTRACT

A method and apparatus for measuring the rate of recirculation of exhaust gases in an internal combustion engine are disclosed. The rate of recirculation is measured by determining the percentage of carbon gas in the exhaust gas, determining the percentage of carbon gas in the intake gas at a point downstream from the introduction of the recirculated gas and comparing the ratios of carbon gas in the two gases. The gases are drawn off for collection and determination of carbon gas content by a vacuum generator connected to a carbon analyzer and a pressure regulator. A 3-way selection valve is used for drawing off either the exhaust or intake gas.

4 Claims, 2 Drawing Figures

METHOD FOR MEASURING THE RATE OF RECIRCULATION OF EXHAUST GASES IN AN INTERNAL COMBUSTION ENGINE AND DEVICE FOR PUTTING SAID METHOD INTO PRACTICE

BACKGROUND OF THE INVENTION

1. Field of the Invention

The present invention relates to a method for measuring the recirculation rates in an internal combustion engine so as to monitor the recirculation device with which said engine is equipped.

2. Description of the Prior Art

Existing known methods for measuring the flow of exhaust gas consist in using a diaphragm having a known section and measuring upstream and downstream pressures, and then calculating flow. Such methods are relatively imprecise since if this device is directly applied to the recirculation system of the engine, it is necessary to correct the calculated values, both in terms of pulse rate and gas density (temperature-composition) to obtain a flow-weight ratio.

Installation of such a device is not always easy and furthermore causes a disturbance of the recirculation device's operation due to load losses. In addition, if one wishes to know the rate of recirculation, it is necessary to measure the flow of gas taken in by the engine, and this is complicated.

Means for directly determining the flow of recirculated gas and, at the same time, the rate of recirculation, can therefore not be presently effected in a simple way on an engine. In the after-sale period, it is therefore particularly difficult to ensure proper functioning of a recirculation device installed on the engine. The sole approximative method consists of removing the recirculation device and testing it on a stand devised for this purpose. The test stand must be equipped with two depressurization sources, one of which serves to control the device while the other is intended to create a flow of air in the apparatus being measured, where it is at least possible to measure one section of passage.

This second method of operation entails the following disadvantages: it is necessary to remove the device from the engine to test it on the stand, then to replace it once the test is over; the conditions in which the device is tested are different from operating conditions (temperature, vibrations, etc.), which may prevent a flaw in the functioning of the device under real conditions from showing up; it is difficult to obtain test conditions with control pressures and flow which approximate reality.

SUMMARY OF THE INVENTION

The present invention is intended to eliminate the disadvantages of prior art methods by providing a method according to which the rate of carbon gas in the exhaust gas, on the one hand, and the rate of carbon gas in an area of the intake collector located downstream from the point of introduction of recirculated gases, on the other, are determined, the ratio of these two parameters furnishing an exact value of the rate of recirculation of exhaust gases.

The invention also contemplates a device intended to put this method into practice. The device includes a mechanism for drawing off gases within the intake collector at a point of the latter located downstream from the point(s) of injection of recycled gases, and means for drawing off exhaust gases, each of which are connected to selection means for transferring each current of gas thus drawn off to a device for analyzing their $CO_2$ concentrations.

The device is further notable for the following points: the means for drawing off a current of gas at the intake stage are constituted by a vacuum generating device connected to a buffer chamber which is connected, on the one hand, to an analyzing system and, on the other, to a pressure regulating element; the selection means are constituted by a 3-way selection cock or valve, activated mechanically or automatically.

BRIEF DESCRIPTION OF THE DRAWINGS

Various other objects, features and attendant advantages of the present invention will be more fully appreciated as the same becomes better understood from the following detailed description when considered in connection with the accompanying drawings in which like references characters designate like or corresponding parts throughout the several views, and wherein.

DETAILED DESCRIPTION OF THE PREFERRED EMBODIMENTS

Figure 1:
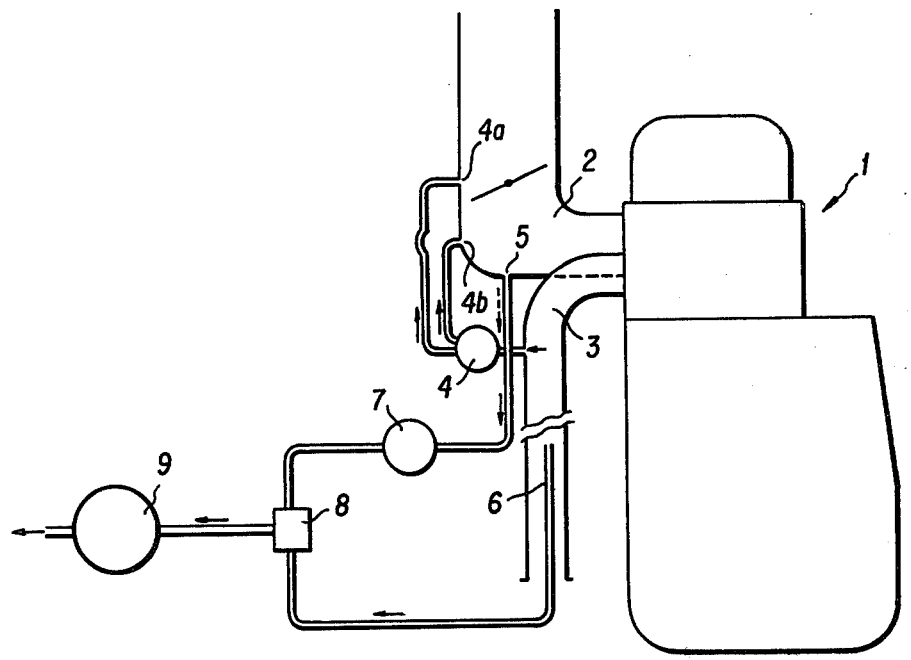
FIG. 1 is a diagram of a device for recirculation of burned gases having a monitoring device according to the present invention.

At point 5 located on intake collector 2 of internal combustion engine 1, downstream from openings 4a, 4b for recycling the burned gases transferred by recirculation control system 4, a current of gas is drawn off by means of a vacuum generating system 7. Within the axis of exhaust collector 3 is disposed a conduit 6 for drawing off a current of exhaust gas having the same chemical composition as the gases recirculated by system 4.

The currents lead to a 3-way selection cock or valve 8 which directs them by turns toward a system 9 for analyzing the $CO_2$ concentration of the gases.

Figure 2:
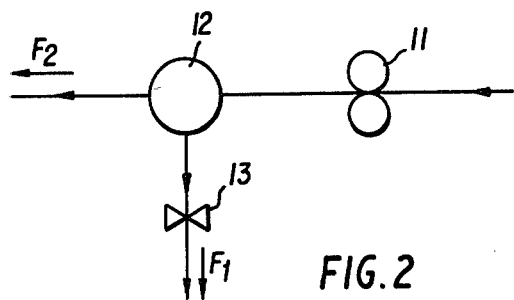
FIG. 2 is a diagram of the vacuum generating device used in the monitoring device according to the invention.

Vacuum generating system 7, as shown in FIG. 2, is composed of a classic vacuum pump 11 above which is mounted a buffer chamber 12 connected along arrow $F_2$ to selection cock 8 on the one hand and, on the other, along arrow $F_1$ to pressure regulating element 13, e.g., a valve or cock intended to keep said chamber 12 at essentially constant pressure (e.g., $\simeq 1$ atm.)

The device may operate in the following manner:

The engine is started, either at a stop or for operation of the vehicle, then set at a certain speed for which measurements of $CO_2$ concentrations in the intake and exhaust gases are carried out.

1. Measurement of $CO_2$ concentration in intake gases.

(a) Since drawing off point 5 is located in a part of collector 2 located well below openings 4a and 4b, all of the recirculated exhaust gas is well mixed with fresh gas;

(b) Vacuum pump 11 (FIG. 2) is set into operation so as to extract a certain volume of gas which it delivers into a reservoir 12 (FIG. 2) kept at essentially constant absolute pressure (e.g., $\simeq 1$ atm) by pressure regulator 13 (FIG. 2);

(c) Three-way cock 8 is next positioned so as to allow the circulation of gas from reservoir 12 toward $CO_2$ analyzer 9 (FIG. 1);

(d) The $CO_2$ concentration, called (a), of the fresh gases, registered by analyzer 9, is then read.

2. Measurement of $CO_2$ concentration in exhaust gases.

(a) Three-way cock 8 is oriented so that a drawing off of exhaust gas through flexible tube 6 placed axially within the exhaust pipe, or through any other means, can be transferred to analyzer 9;

(b) The $CO_2$ concentration of the exhaust gases, registered by analyzer 9 and called (b), is read.

3. Calculation of the EGR rate (Exhaust Gas Recirculation).

The EGR rate is then given by the formula:

$$\tau = (a)/(b-a)$$

in which a and b are defined as above.

If great precision of the EGR rate is not sought, and a simple check is all that is needed, it is not necessary to measure exhaust $CO_2$; it is enough to take as an average value b=13.5%, the real concentration never being very far from this value with usual operating richnesses.

$$\tau = (a)/(13.5-a)$$

It will be noted that the error in this case does not exceed 5%.

It should be noted that the means for putting the invention to work to monitor the rate of recirculation are simple and inexpensive, since the analyzer and the pump are commercially available, and the only modification to be made in the engine to effect the monitoring consists of the manufacturer providing a gas sampling opening in the intake collector.

It should further be noted that a hole of this type often exists already for other uses, e.g., for reaspiration of crankcase gases.

It is clear that the method of the invention enables a quick check of the recirculation system of an engine. In fact, it is enough to take two successive measurements of $CO_2$ concentration in the intake and exhaust to obtain the effective recirculation rate. This method thus enables direct measurement of recirculation rate (ratio of mass flow of exhaust gas to mass flow of fresh gas).

It is this parameter which is determining for the operation of the engine, as far as its operating stability and antipollution rate are concerned. Such a parameter has heretofore not been measureable in a simple way by any other method based upon direct measurement of flow.

Checking of the exhaust gas recirculation by the device may either be done at a station (vehicle stopped-/engine running or vehicle on rollers/engine running) or on a road test with the vacuum pump and analyzer on board.

Such a measurement carried out while the car is in motion does not interfere with the operation of the engine since the flow of gas needed by the analyzer represents less than 1% of the air flow taken in by the engine under all operating conditions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for measuring the rate of recirculation of exhaust gas in an internal combustion engine comprising the steps of introducing said exhaust gas into an analyzer, using said analyzer to measure the percentage of carbon gas in the exhaust gas, introducing a second gas from an area of the intake collector located downstream from the introduction point of the recirculated gas into said analyzer, using said analyzer to measure the percentage of carbon gas in said second gas, and using said analyzer to calculate the ratio of said percentages, said ratio furnishing an exact value of the rate of recirculation of said gases.

2. An apparatus for measuring the rate of recirculation of exhaust gas in an internal combustion engine having an intake collector including means for injecting recycled gas, comprising means for drawing off intake gases from the intake collector at a point in said intake collector located downstream from the point of injection of said recycled gases into said intake collector, and means for drawing off exhaust gases, each of said means for drawing off being connected to a selection means for transferring each of said intake and exhaust gases thus drawn off to a device for analyzing their $CO_2$ concentration.

3. The apparatus of claim 2 wherein said means for drawing off a current of gas from the intake comprises a vacuum generating device connected to a buffer chamber said buffer chamber being connected to said analyzing device and also being connected to a pressure regulating element.

4. The apparatus of claim 2 wherein said selection means are constituted by a 3-way selection cock or valve, said cock or valve being activated mechanically.

* * * * *

UNITED STATES PATENT AND TRADEMARK OFFICE
CERTIFICATE OF CORRECTION

PATENT NO. : 4,308,846
DATED : Jan. 5, 1982
INVENTOR(S) : Pierre Cochard, et. al.

It is certified that error appears in the above-identified patent and that said Letters Patent are hereby corrected as shown below:

On The Title Page, Item (75), should read

-- [75] --- Inventors: Pierre Cochard, Saint-Vrain; Bruno de Sainte-Marie, Chatenay-Malabry, both of France --.

Signed and Sealed this

Thirtieth Day of March 1982

[SEAL]

Attest:

Attesting Officer

GERALD J. MOSSINGHOFF
*Commissioner of Patents and Trademarks*